US008208522B2

(12) United States Patent
Tupala et al.

(10) Patent No.: US 8,208,522 B2
(45) Date of Patent: Jun. 26, 2012

(54) SYSTEM AND METHODS FOR RECEIVING OFDM SYMBOLS HAVING TIMING AND FREQUENCY OFFSETS

(75) Inventors: Miika Sakari Tupala, Turku (FI); Jukka Allan Henriksson, Espoo (FI); Jussi Vesma, Turku (FI)

(73) Assignee: Nokia Corporation, Espoo (FI)

( * ) Notice: Subject to any disclaimer, the term of this patent is extended or adjusted under 35 U.S.C. 154(b) by 1117 days.

(21) Appl. No.: 12/044,026

(22) Filed: Mar. 7, 2008

(65) Prior Publication Data
US 2009/0225822 A1 Sep. 10, 2009

(51) Int. Cl.
*H04B 3/46* (2006.01)
*H03C 3/00* (2006.01)
*H04J 11/00* (2006.01)
(52) U.S. Cl. .................. 375/226; 375/303; 370/208
(58) Field of Classification Search .............. 375/226, 375/303; 370/208
See application file for complete search history.

(56) References Cited

U.S. PATENT DOCUMENTS

| | | | | |
|---|---|---|---|---|
| 4,768,202 A | * | 8/1988 | Lacroix et al. | 375/213 |
| 5,793,759 A | * | 8/1998 | Rakib et al. | 370/342 |
| 6,074,086 A | * | 6/2000 | Yonge, III | 708/422 |
| 6,078,980 A | * | 6/2000 | Holland et al. | 713/400 |
| 6,438,173 B1 | * | 8/2002 | Stantchev | 375/260 |
| 7,606,138 B2 | * | 10/2009 | Wang et al. | 370/210 |
| 2003/0223354 A1 | * | 12/2003 | Olszewski | 370/208 |
| 2004/0105344 A1 | * | 6/2004 | Davies et al. | 367/134 |
| 2005/0068886 A1 | * | 3/2005 | Wang et al. | 370/210 |
| 2006/0159194 A1 | | 7/2006 | Magee | |
| 2007/0002878 A1 | * | 1/2007 | Moorti et al. | 370/401 |
| 2007/0254685 A1 | * | 11/2007 | Oketani et al. | 455/500 |
| 2010/0246719 A1 | * | 9/2010 | Ko et al. | 375/303 |

FOREIGN PATENT DOCUMENTS

EP 1 689 141 A1 8/2006

OTHER PUBLICATIONS

ETSI: "Frame structure channel coding and modulation for a second generation digital terrestrial television broadcasting system (DVB-T2)", Digital Video Broadcasting Document A122R1, [Online] No. DVB Document A122r1, Jan. 2008, XP002523675, pp. 1-165.
Zou, H., et al., "An Integrated OFDM Receiver for High-Speed Mobile Data Communications," Global Telecommunications Conference 2001 (GLOBECOM '01), 2001, pp. 3090-3094, vol. 5, IEEE, San Antonio, TX.

* cited by examiner

*Primary Examiner* — David C. Payne
*Assistant Examiner* — Sarah Hassan
(74) *Attorney, Agent, or Firm* — Banner & Witcoff, Ltd.

(57) ABSTRACT

Systems and methods for receiving an OFDM preamble without knowledge of channel characteristics are provided. An OFDM preamble signal with frequency shifted cyclic extensions is received. Taken together the cyclic extensions form a frequency shifted version of the OFDM preamble signal. Frequency offsets and timing offsets are estimated and corrected in an efficient manner using a simple concatenation approach in the time domain, followed by a summation of the OFDM preamble signal and the concatenation after a transformation of the OFDM preamble and the concatenation into the frequency domain. Phase errors in the frequency domain are estimated and corrected after FFT transformations of the received signals. A valid preamble is detected and additional parameters for receiving subsequently transmitted OFDM symbols in a channel are extracted from the OFDM preamble. The methods are computationally efficient and robust. Receiver implementations for performing the methods in a DVB receiver are disclosed.

35 Claims, 10 Drawing Sheets

SYSTEM AND METHODS FOR RECEIVING OFDM SYMBOLS HAVING TIMING AND FREQUENCY OFFSETS

TECHNICAL FIELD

The present invention is directed, in general, to communication systems and, more particularly, to a system and method for receiving orthogonal frequency division multiplexed ("OFDM") symbols in a broadcasting system using a transmission channel with initially unknown modulation characteristics, the OFDM symbols being subject to timing and frequency offsets that may be compensated for in the receiver. In one application the broadcasted OFDM symbols are part of a next generation digital video broadcasting ("DVB-T2") transmission scheme.

BACKGROUND

The DVB standard for broadcasting over-the-air video signals (e.g. video/television) is used in many countries as the present method for transmission of digital television signals. The DVB standards include standards for cable transmission ("DVB-C"), satellite transmission ("DVB-S"), over-the-air terrestrial transmission ("DVB-T"), and recently, specific DVB-T transmission to mobile devices ("DVB-H"). The DVB-T standard supports the transmission of standard definition ("SD") and high definition ("HD") video and data signals to receivers such as HD-ready televisions, and more frequently, set-top boxes ("STBs") that receive the signals from transmitters and provide digital, or analog, television compatible outputs for viewing.

FIG. 1 depicts a simplified block diagram for a typical DVB application. In FIG. 1, a DVB transmission system provides an MPEG multiplexer 3 that combines MPEG-2 broadcast streams of video, audio, and/or data content, these MPEG-2 streams output from the MPEG-2 multiplexer 3 are then input into a transport stream multiplexer 5 having multiple inputs, the output of this transport stream multiplexer, transport stream ("TS") signals, are then signal modulated by modulator 7 for DVB-T transmission including OFDM, guard interval ("GI") insertion, and then processed to radio frequency ("RF") signals using an analog transmitter 9 including a digital-to-analog converter ("DAC") and an analog front end ("AFE"). These RF DVB-T signals are then transmitted over the air using an antenna 11. As is known to those skilled in the art, insertion of guard intervals or GI for OFDM symbols, where the "tail" of the symbol is repeated in front of the symbol for a time period, can be used to eliminate problems caused by the inter-symbol interference ("ISI"). ISI is often caused by multipath reception (receiving multiple copies of the same transmission) at the receiver. These GI symbols are later removed at the receiver.

On the receiving end, DVB capable television receivers 23, or alternatively set top boxes 15, receive the RF signals from antennas 21 and 13, respectively. The RF signals received are then processed back to digital signals in MPEG-2 format using an analog front end ("AFE") and analog-to-digital converter ("ADC"), and the signals are then demodulated, demultiplexed and the receiver then provides a selection of video and audio signals to a television or video monitor, for viewing by the user. Some recently produced televisions or monitors such as 23 shown in FIG. 1 may include integral DVB receivers. Users may also receive DVB-T signals using a set top box or dedicated receiver equipment, such as 15 in FIG. 1, and receive an output on an analog television such as 17 in FIG. 1. The television 23 with an integrated DVB-T receiver capability may eliminate the need for a set top box. In some environments the set top box may include additional desirable functionality, such as digital video recording ("DVR") that the user may use to capture video streams for viewing at a time different than the broadcast time. In any event, once the DVB signal is received, the user can select from the variety of digital video streams and view them.

As handheld devices for wireless communication systems such as cellular telephones, media players, and personal digital assistants ("PDAs") become widely deployed and continue to attract a growing number of users, there is a commercial need to provide video signals, such as television broadcasts, to mobile or handheld portable devices. The DVB-H standard adds certain features to the basic DVB-T standard specifically directed as such receivers. In FIG. 1, a handheld video receiver 19 is shown. Additional DVB standards provide the capability for a user to send responses to the transmitter via a "return channel," so that the mobile device is more than a receiver and may also provide interactive services such as email, text messaging, internet browsing and the like.

DVB-T broadcasting is based on an orthogonal frequency division multiplexed ("OFDM") modulation signaling scheme. This modulation provides a robust signal and a large number of sub-carriers. The DVB-T scheme provides additional features: options that a broadcaster might use are one of three modulation types: quadrature phase shift keying ("QPSK"), 16QAM, 64QAM, one of five different forward error correction ("FEC") rates, one of four different GI lengths, a choice of carriers (2K, or 8K) and a choice of channel bandwidths (6, 7 or 8 MHz). DVB-T can support services such as standard definition digital TV ("SDTV"), high definition digital TV ("HDTV"), radio, interactive services (with return channels) and IP data casting (supporting, for example, internet browsing). DVB-T also features hierarchical modulation, which provides a high priority ("HP") and a low priority ("LP") transport stream. Two different services may be simultaneously broadcast for different receivers, for example, standard definition ("SD") and high definition ("HD") broadcasts.

The robustness of DVB-T has proven capabilities for mobile devices. The DVB-T standard has been improved further with specific standardization directed at mobile receivers in the DVB-H standard. DVB-H adds to DVB-T additional features directed at optimizing broadcasts for mobile receivers, including time slicing, or bursty transmission, which allows the mobile to save power (especially important for battery operated devices); additional modes such as a 4k mode, a compromise between mobile reception capability and SFN cell size; additional forward error correction code MPE-FEC; and an in-depth interleaver which is a short time interleaver for 2k and 4k modes.

Currently, many countries are transitioning from a broadcast environment that includes both DVB-T and pre-existing UHF/VHF analog television over-the-air broadcasting as signals in the frequency spectrum available for television. These transitions are presently moving to an environment of purely digital video broadcasting, over a time period known as "analog turn off." At that time, additional frequency spectrum for digital video broadcast transmissions will become available. In order to further enhance DVB broadcasting and to take advantage of this additional available broadcast spectrum, efforts are presently underway to extend DVB-T standards to next generation (sometimes referred to as "second generation" or "2G") digital video broadcast standards. These standards are presently referred to using various acronyms, but often are referred to as "DVB-T2" for the next generation terrestrial DVB standard, and "DVB-H2" or "DVB-NGH" for the next generation handheld device or mobile DVB standard. Goals for extending the DVB terrestrial standards to the new DVB-T2 standards include increasing higher payloads, providing optimum reception for fixed and mobile receivers, adding additional carriers, reducing peak power, adding multiple-input multiple-output diversity antennas, and better support for internet protocol ("IP") data streaming. New methods and devices for receiving and processing these next generation DVB signals, in an efficient, economic and robust manner, using approaches compatible with existing integrated circuit and receiver technology, without adding significant costs to systems or to the end consumer, are desirable.

SUMMARY OF THE INVENTION

These and other problems are generally solved or circumvented, and technical advantages are generally achieved, by advantageous embodiments of the present invention which include an apparatus and methods according to the embodiments for providing receivers that detect and decode the preamble sequences of OFDM symbols. OFDM symbols are currently defined for DVB-T2 transmissions, however the exemplary embodiments described herein are not limiting, are examples presented to enhance understanding, and the invention is not limited to DVB-T2 applications. The methods disclosed will provide efficient algorithms for use in receiving OFDM preamble symbols having certain timing and frequency offsets. Exemplary embodiments are described that may be used in a practical DVB-T2 receiver embodiment for estimating and correcting for time offset and frequency offset errors. These errors are necessarily present in receiving the preamble OFDM signals over an un-characterized transmission channel, such as in receiving an initial OFDM preamble.

According to an exemplary embodiment, a receiver detects a received OFDM preamble having a first portion including a complete cycle of OFDM signals, and including a cyclic prefix extension that is a frequency shifted portion of the first part of the first portion and including a cyclic suffix that is a frequency shifted portion of the second part of the first portion, the cyclic prefix and cyclic suffix together forming a frequency shifted portion that replicates the first portion. The receiver advantageously determines an estimated integer frequency offset from the first portion and a concatenation of the cyclic suffix and the cyclic prefix. The receiver first performs a transformation to the frequency domain on both the first portion, and the concatenation, after which the integer frequency offset estimate can be solved from the power of the received subcarriers. The receiver then compensates for the phase error that results from the frequency offset between the first portion and the concatenated portion and adds the portions coherently.

According to another exemplary embodiment, a method for removing phase errors from received OFDM preamble symbols is disclosed. In the method, a received OFDM symbol comprises a first portion including a complete cycle of OFDM signals, and including a cyclic prefix extension that is a frequency shifted portion of the first part of the first portion of the received OFDM symbol and including a cyclic suffix that is a frequency shifted portion of the second part of the first portion of the received OFDM symbol, the cyclic prefix and cyclic suffix concatenated together forming a frequency shifted portion that replicates the first portion. An estimation of a frequency offset is performed. A frequency domain transformation of the first portion and a frequency domain transformation of the concatenation of the cyclic prefix and the cyclic suffix are performed. A correction to compensate for phase error due to the frequency offset is applied to one of the frequency domain symbols. The frequency domain transformed first portion and the frequency domain transformed concatenation are combined in a coherent addition to compensate for the frequency offset.

According to another exemplary embodiment, a method for removing phase errors from received OFDM preamble symbols is disclosed. In the method, a received OFDM symbol comprises a first portion including a complete cycle of OFDM signals, and including a cyclic prefix extension that is a frequency shifted portion of the first part of the first portion and including a cyclic suffix that is a frequency shifted portion of the second part of the first portion, the cyclic prefix and cyclic suffix together forming a frequency shifted portion that replicates the first portion. A transformation of the first portion and a concatenation of the cyclic prefix and the cyclic suffix to the frequency domain are performed. A correction to compensate for phase error due to timing offsets is applied. During a demodulation of the frequency transformed OFDM symbols, differential binary phase shift keying ("DBPSK") demodulation is performed including a correction to compensate for the phase error.

In another exemplary embodiment, a receiver implementation is provided. The receiver receives an OFDM preamble symbol having a complete sequence of N samples, a prefix that is a frequency shifted cyclic extension of the first portion of the preamble symbol having a length of N samples/2 plus an offset and a suffix that is a frequency shifted cyclic extension of the second portion of the preamble symbol having a length of N samples/2 minus the offset. The receiver performs a concatenation operation to combine the prefix and suffix to form a frequency shifted copy of the preamble symbol that is N samples in length. Fast Fourier transformations ("FFT") are performed on the N samples of the preamble symbol and on the concatenated samples. In the frequency domain, the phase rotation that is due to a carrier frequency offset is corrected by applying a correction to the concatenation sequence. The Fourier transformed sequences of the preamble symbol and the concatenation after the phase correction are then combined in a coherent addition, and the phase rotation is thereby compensated.

In another exemplary embodiment, a receiver implementation is provided. The receiver receives an OFDM preamble symbol having a complete sequence of N samples, a prefix that is a frequency shifted cyclic extension of the first portion of the preamble symbol having a length of N samples/2 plus an offset and a suffix that is a frequency shifted cyclic extension of the second portion of the preamble symbol having a length of N samples/2 minus the offset. The receiver performs a concatenation operation to combine the prefix and suffix samples to form a frequency shifted copy of the preamble symbol that is also N samples in length. Fast Fourier transformations are performed on the N samples of the preamble symbol and also on the concatenated samples. In the frequency domain, the phase rotation that is due to timing offsets is estimated by calculating the average carrierwise phase difference between the concatenation and the preamble symbol. The receiver then compensates for the estimated phase rotation in performing the DBPSK demodulation of the frequency domain sequences, or, by adjusting directly the symbol timing.

In an additional exemplary embodiment, a method for receiving an OFDM preamble symbol is disclosed. In the method, a received OFDM symbol having a first length N is received including a frequency shifted cyclic extension prefix that includes the first portion of the OFDM symbol and has a length of N/2 samples plus an offset, and a frequency shifted cyclic extension suffix that includes the remaining portion of the OFDM symbol and has a length of N/2 samples minus the offset. The receiver performs a concatenation of the prefix and suffix to form a frequency shifted sequence that is N samples in length and replicates the preamble OFDM symbol, Fast Fourier transformation is performed on the N sample OFDM preamble symbol and the N sample concatenation. A phase correction is performed on the frequency domain concatenation samples and the frequency domain OFDM preamble samples are combined in a coherent addition with the frequency domain concatenation sequence. The method continues and an estimate of phase rotation in the frequency domain samples due to a timing offset is made. The estimate is applied to a DBPSK demodulation performed on the coherently added frequency domain symbols and the phase rotation due to the timing offset is compensated.

In another exemplary embodiment, a computer readable medium is described that provides instructions for programming a programmable receiver. The program steps program the programmable receiver to perform a method for receiving the OFDM preamble. In the method, a received OFDM symbol having a first length N is received including a frequency shifted cyclic extension prefix that includes the first portion of the OFDM symbol and has a length of N/2 samples plus an offset, and a frequency shifted cyclic extension suffix that includes the remaining portion of the OFDM symbol and has a length of N/2 samples minus the offset. The receiver is programmed by the instructions stored on the computer readable medium to perform a concatenation of the prefix and suffix to form a frequency shifted sequence that is N samples in length, and replicates the preamble OFDM symbol. The computer readable medium further provides instructions to the receiver causing Fast Fourier transformation on the N sample OFDM preamble symbol and on the N sample concatenation. The computer readable medium further provides instructions to cause the programmable receiver to perform phase correction on the concatenation samples in the frequency domain. The computer readable medium further provides instructions causing the programmable receiver to combine the compensated frequency domain samples from the concatenation and the frequency domain samples from the OFDM preamble in a coherent addition. The computer readable medium further provides instructions causing the programmable receiver to make an estimate of phase rotation in the frequency domain samples due to a timing offset. The computer readable medium further provides instructions to cause the programmable receiver to perform a DBPSK demodulation on the coherently added frequency domain symbols and the phase rotation due to the timing offset is compensated.

In another exemplary method, OFDM preamble symbols are received by receiving an OFDM preamble comprising symbol A of length N samples, a prefix C comprising a frequency shifted cyclic extension of the first portion of A of length N/2 samples plus an offset K samples, and a suffix B comprising a frequency shifted cyclic extension of the remaining portion of A of length N/2 samples minus offset K samples; concatenating prefix C and suffix B in the time domain to form a concatenated symbol CB that is a frequency shifted version of A having length N; transforming A into the frequency domain by performing a fast Fourier transform of length N; transforming the concatenated symbol CB into the frequency domain by performing a fast Fourier transform of length N; estimating a phase rotation; and correcting the phase rotation in the frequency domain. In another exemplary method, the received OFDM preamble has a length N of 1024. In another exemplary method, the receiver receives an OFDM preamble where the offset K=0. In another exemplary method, the receiver receives an OFDM preamble where the offset K is an integer greater than 0.

In another exemplary method, a receiver receives an OFDM preamble symbol by receiving over the air spread spectrum modulated radio frequency signals. In another exemplary method, the receiver receives the OFDM preamble by receiving over the air radio frequency spread spectrum modulated signals; performing baseband filtering to extract an analog received signal; and by performing analog-to-digital conversion to form digital signals comprising the OFDM preamble symbol.

In another exemplary method, OFDM preamble symbols are received by receiving an OFDM preamble comprising symbol A of length N samples, a prefix C comprising a frequency shifted cyclic extension of the first portion of A of length N/2 samples plus an offset K samples, and a suffix B comprising a frequency shifted cyclic extension of the remaining portion of A of length N/2 samples minus offset K samples; concatenating prefix C and suffix B in the time domain to form a concatenated symbol CB that is a frequency shifted version of A having length N; transforming A into the frequency domain by performing a fast Fourier transform of length N; transforming the concatenated symbol CB into the frequency domain by performing a fast Fourier transform of length N; estimating a phase rotation; and correcting the phase rotation in the frequency domain; wherein estimating the phase rotation comprises estimating the phase error due to an integer frequency offset. In another exemplary method, estimating the phase error due to an integer frequency offset comprises performing the calculation:

$$\Delta\phi = 2\pi\varepsilon\frac{N_C}{N}$$

where $N_C$ is the number of samples in C, and $\varepsilon$ is the normalized frequency offset (frequency offset divided by the subcarrier spacing). In another exemplary method, the phase rotation due to an integer frequency offset is corrected by performing a complex multiplication on the frequency domain symbol CB and coherently adding the frequency domain symbols A and CB.

In another exemplary method, receiving the OFDM preamble symbol further comprises performing DBPSK demodulation on the frequency domain symbols and extracting parameters to be used in receiving subsequent OFDM symbols. In another exemplary method, extracting the parameters comprises extracting one or more modulated signal sequences. In another exemplary method, receiving OFDM preamble symbols further comprises receiving digital video broadcast signals.

In another exemplary method, receiving spread spectrum modulated radio frequency signals further comprises receiving radio frequency signals at an antenna.

In another exemplary method, a receiver receives an OFDM preamble by receiving an OFDM preamble comprising symbol A of length N samples, a prefix C comprising a frequency shifted cyclic extension of the first portion of A of length N/2 samples plus an offset K samples, a suffix B comprising a frequency shifted cyclic extension of the remaining portion of A of length N/2 samples minus offset K samples; concatenating prefix C and suffix B in the time domain to form a concatenated symbol CB that is a frequency shifted version of A having length N; transforming A into the frequency domain by performing a fast Fourier transform of length N; transforming the concatenated symbol CB into the frequency domain by performing a fast Fourier transform of length N; estimating a phase rotation due to an integer frequency offset; correcting the phase rotation in the frequency domain to produce a corrected frequency domain symbol; estimating a phase error due to a timing offset; and correcting the phase error due to the timing offset during a demodulation. In another exemplary method, the receiver receives an OFDM preamble with a length N=1024. In another exemplary method, the receiver receives an OFDM preamble with cyclic extensions having an offset K=0. In another exemplary method, the receiver receives the OFDM preamble with cyclic extensions having an offset K that is an integer greater than 0.

In another exemplary method, the receiver receiving the OFDM preamble symbol receives over-the-air spread spectrum modulated radio frequency signals. In another exemplary method, the receiver receiving over-the-air spread spectrum modulated radio frequency signals further performs baseband filtering to extract an analog received signal and performs analog-to-digital conversion on the analog received signal to form digital signals comprising the OFDM preamble symbol.

In another exemplary method, a receiver receives an OFDM preamble by receiving an OFDM preamble comprising symbol A of length N samples, a prefix C comprising a frequency shifted cyclic extension of the first portion of A of length N/2 samples plus an offset K samples, a suffix B comprising a frequency shifted cyclic extension of the remaining portion of A of length N/2 samples minus offset K samples; concatenating prefix C and suffix B in the time domain to form a concatenated symbol CB that is a frequency shifted version of A having length N; transforming A into the frequency domain by performing a fast Fourier transform of length N; transforming the concatenated symbol CB into the frequency domain by performing a fast Fourier transform of length N; estimating a phase rotation due to an integer frequency offset; correcting the phase rotation in the frequency domain to produce a corrected frequency domain symbol; estimating a phase error due to a timing offset; and correcting the phase error due to the timing offset during a demodulation; wherein estimating the phase error due to the timing offset comprises performing the calculation:

$$\hat{\phi} = \frac{1}{K} \sum_{k \in CDS} \arg(y_{CB,k+1} y_{A,k}^*)$$

on the frequency domain symbols A and CB, where $y_{A,k}$ is the kth subcarrier of part A, and K is the total number of subcarriers in the OFDM preamble.

In an exemplary apparatus, a receiver circuit configured to receive an OFDM preamble comprising symbol A of length N samples, a prefix C comprising a frequency shifted cyclic extension of the first portion of A of length N/2 samples plus an offset K samples, and a suffix B comprising a frequency shifted cyclic extension of the remaining portion of A of length N/2 samples minus offset K samples is provided, a concatenation circuit configured to concatenate prefix C and suffix B to form a frequency shifted version CB of symbol A of length N samples is provided, a first fast Fourier transform circuit configured to perform a fast Fourier transform of length N on symbol A is provided, and a second fast Fourier transform circuit configured to perform a fast Fourier transform of length N on concatenated symbol CB is provided. Phase rotation estimation circuitry configured to calculate a phase rotation estimate due to integer frequency offset is provided, and correction circuitry configured to perform a phase rotation correction using the phase rotation estimate is provided.

In another exemplary apparatus, a receiver circuit configured to receive an OFDM preamble comprising symbol A of length N samples, a prefix C comprising a frequency shifted cyclic extension of the first portion of A of length N/2 samples plus an offset K samples, and a suffix B comprising a frequency shifted cyclic extension of the remaining portion of A of length N/2 samples minus offset K samples is provided, a concatenation circuit configured to concatenate prefix C and suffix B to form a frequency shifted version CB of symbol A of length N samples is provided, a first fast Fourier transform circuit configured to perform a fast Fourier transform of length N on symbol A is provided, and a second fast Fourier transform circuit configured to perform a fast Fourier transform of length N on concatenated symbol CB is provided. Phase rotation estimation circuitry configured to calculate a phase rotation estimate due to integer frequency offset is provided, and correction circuitry configured to perform a phase rotation correction using the phase rotation estimate is provided, wherein the receiver circuit further comprises analog front end circuitry configured to receive spread spectrum modulated radio frequency signals and to perform baseband processing on the received radio frequency signals and analog-to-digital circuitry configured to receive analog signals from the analog front end circuitry and to perform analog-to-digital conversion, outputting the OFDM symbols. In another exemplary apparatus, the receiver further comprises an antenna.

In another exemplary apparatus, a receiver circuit configured to receive an OFDM preamble comprising symbol A of length N samples, a prefix C comprising a frequency shifted cyclic extension of the first portion of A of length N/2 samples plus an offset K samples, and a suffix B comprising a frequency shifted cyclic extension of the remaining portion of A of length N/2 samples minus offset K samples is provided, a concatenation circuit configured to concatenate prefix C and suffix B to form a frequency shifted version CB of symbol A of length N samples is provided, a first fast Fourier transform circuit configured to perform a fast Fourier transform of length N on symbol A is provided, and a second fast Fourier transform circuit configured to perform a fast Fourier transform of length N on concatenated symbol CB is provided. Phase rotation estimation circuitry configured to calculate a phase rotation estimate due to integer frequency offset is provided, and correction circuitry configured to perform a phase rotation correction using the phase rotation estimate is provided, wherein the phase rotation estimation circuitry is configured to perform the calculation of:

$$\Delta\phi = 2\pi\varepsilon \frac{N_C}{N}$$

where $N_C$ is the number of samples in C, and $\varepsilon$ is the normalized frequency offset.

In yet another exemplary apparatus, a receiver circuit configured to receive an OFDM preamble comprising symbol A of length N samples, a prefix C comprising a frequency shifted cyclic extension of the first portion of A of length N/2 samples plus an offset K samples, and a suffix B comprising a frequency shifted cyclic extension of the remaining portion of A of length N/2 samples minus offset K samples is provided, a concatenation circuit configured to concatenate prefix C and suffix B to form a frequency shifted version CB of symbol A of length N samples is provided, a first fast Fourier transform circuit configured to perform a fast Fourier transform of length N on symbol A is provided, and a second fast Fourier transform circuit configured to perform a fast Fourier transform of length N on concatenated symbol CB is provided. Phase rotation estimation circuitry configured to calculate a phase rotation estimate due to integer frequency offset is provided, and correction circuitry configured to perform a phase rotation correction using the phase rotation estimate is provided, wherein the correction circuitry further comprises multiplication circuitry configured to perform a complex multiplication on the frequency domain symbol CB by a phase rotation estimate and adding circuitry configured to coherently add the frequency domain symbols A and CB.

In another exemplary apparatus, a receiver circuit configured to receive an OFDM preamble comprising symbol A of length N samples, a prefix C comprising a frequency shifted cyclic extension of the first portion of A of length N/2 samples plus an offset K samples, and a suffix B comprising a frequency shifted cyclic extension of the remaining portion of A of length N/2 samples minus offset K samples is provided; a concatenation circuit configured to concatenate prefix C and suffix B to form a frequency shifted version CB of symbol A of length N samples is provided; a first fast Fourier transform circuit configured to perform a fast Fourier transform of length N on symbol A is provided; a second fast Fourier transform circuit configured to perform a fast Fourier transform of length N on concatenated symbol CB is provided; phase rotation estimation circuitry configured to calculate a phase rotation estimate due to integer frequency offset is provided; correction circuitry configured to perform a phase rotation correction using the phase rotation estimate is provided; phase error estimation circuitry configured to estimate a phase error due to timing offsets and to output a phase error correction is provided; and demodulation circuitry configured to receive the output of the correction circuitry and to perform DBPSK demodulation including correcting for the phase error using the phase error correction is provided.

In another exemplary apparatus, a receiver circuit configured to receive an OFDM preamble comprising symbol A of length N samples, a prefix C comprising a frequency shifted cyclic extension of the first portion of A of length N/2 samples plus an offset K samples, and a suffix B comprising a frequency shifted cyclic extension of the remaining portion of A of length N/2 samples minus offset K samples is provided; a concatenation circuit configured to concatenate prefix C and suffix B to form a frequency shifted version CB of symbol A of length N samples is provided; a first fast Fourier transform circuit configured to perform a fast Fourier transform of length N on symbol A is provided; a second fast Fourier transform circuit configured to perform a fast Fourier transform of length N on concatenated symbol CB is provided; phase rotation estimation circuitry configured to calculate a phase rotation estimate due to integer frequency offset is provided; correction circuitry configured to perform a phase rotation correction using the phase rotation estimate is provided; phase error estimation circuitry configured to estimate a phase error due to timing offsets and to output a phase error correction is provided; and demodulation circuitry configured to receive the output of the correction circuitry and to perform DBPSK demodulation including correcting for the phase error using the phase error correction is provided; wherein the receiver circuit further comprises analog front end circuitry configured to receive spread spectrum modulated radio frequency signals and to perform baseband processing on the received radio frequency signals and analog-to-digital circuitry configured to receive analog signals from the analog front end circuitry and to perform analog-to-digital conversion, outputting the OFDM symbols.

In another exemplary apparatus, a computer readable medium is provided containing instructions that, when executed by a programmable receiver processor, perform receiving an OFDM preamble comprising symbol A of length N samples, a prefix C comprising a frequency shifted cyclic extension of the first portion of A of length N/2 samples plus an offset K samples, a suffix B comprising a frequency shifted cyclic extension of the remaining portion of A of length N/2 samples minus offset K samples; concatenating prefix C and suffix B in the time domain to form a concatenated symbol CB that is a frequency shifted version of A having length N; transforming A into the frequency domain by performing a fast Fourier transform of length N; transforming the concatenated symbol CB into the frequency domain by performing a fast Fourier transform of length N; estimating a phase rotation; and correcting the phase rotation in the frequency domain.

In another exemplary embodiment, a computer readable medium is provided containing instructions that, when executed by a programmable receiver processor, perform receiving an OFDM preamble comprising symbol A of length N samples, a prefix C comprising a frequency shifted cyclic extension of the first portion of A of length N/2 samples plus an offset K samples, a suffix B comprising a frequency shifted cyclic extension of the remaining portion of A of length N/2 samples minus offset K samples; concatenating prefix C and suffix B to in the time domain form a concatenated symbol CB that is a frequency shifted version of A having length N; transforming A into the frequency domain by performing a fast Fourier transform of length N; transforming the concatenated symbol CB into the frequency domain by performing a fast Fourier transform of length N; estimating a phase rotation; and correcting the phase rotation in the frequency domain, wherein the instruction performing estimating the phase error further comprises instructions performing estimating the phase error due to an integer frequency offset.

In another exemplary embodiment, a computer readable medium is provided containing instructions that, when executed by a programmable receiver processor, perform receiving an OFDM preamble comprising symbol A of length N samples, a prefix C comprising a frequency shifted cyclic extension of the first portion of A of length N/2 samples plus an offset K samples, a suffix B comprising a frequency shifted cyclic extension of the remaining portion of A of length N/2 samples minus offset K samples; concatenating prefix C and suffix B to in the time domain to form a concatenated symbol CB that is a frequency shifted version of A having length N; transforming A into the frequency domain by performing a fast Fourier transform of length N; transforming the concatenated symbol CB into the frequency domain by performing a fast Fourier transform of length N; estimating a phase rotation due to an integer frequency offset; correcting the phase rotation in the frequency domain to produce a corrected frequency domain symbol; estimating a phase error due to a timing offset; and correcting the phase error due to the timing offset during a demodulation.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the invention, and the advantages thereof, reference is now made to the following descriptions taken in conjunction with the accompanying drawing, in which.

DETAILED DESCRIPTION

Figure 1:
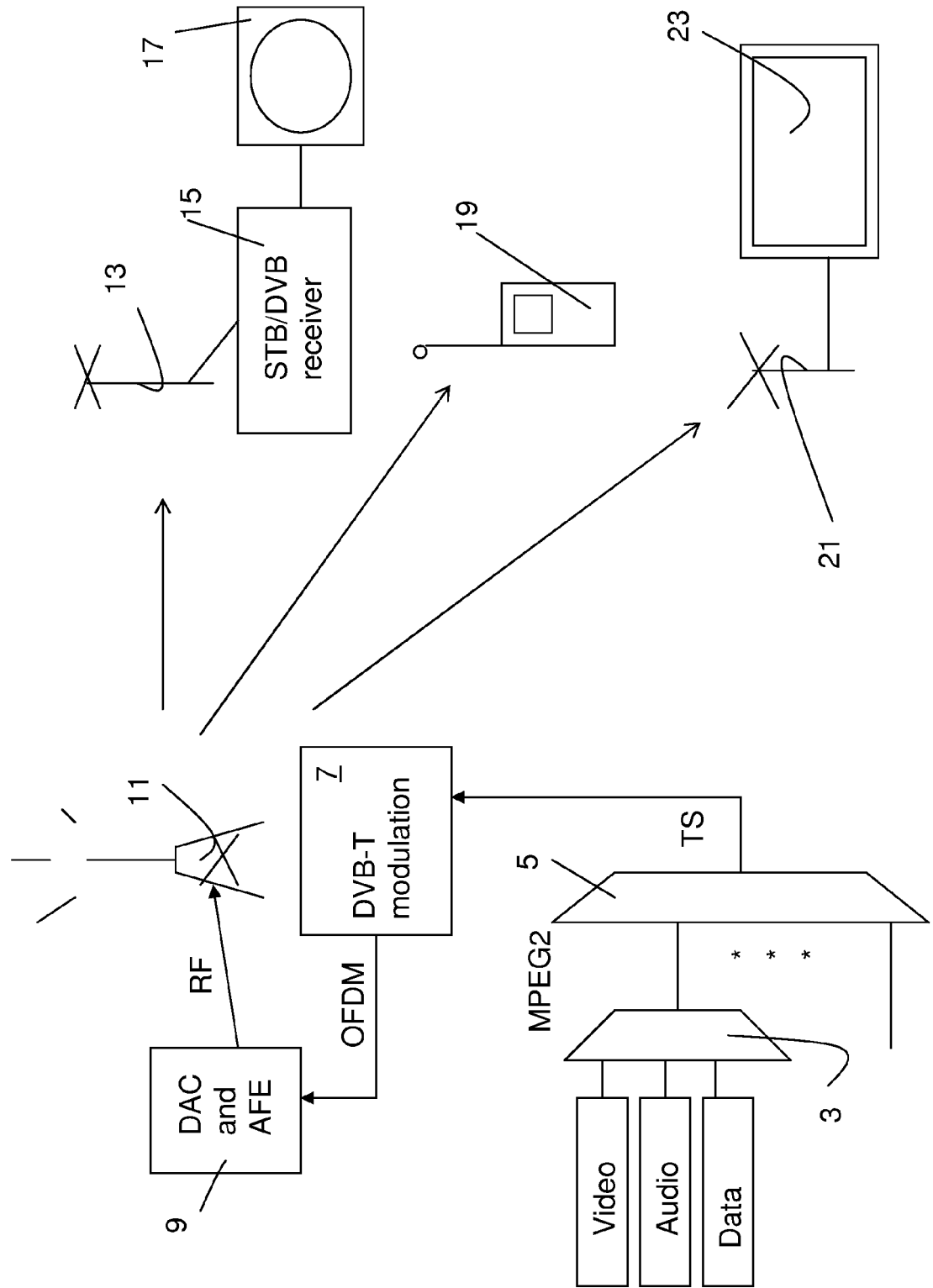
FIG. 1 illustrates a prior art system for transmitting broadcast video signals to a variety of receivers.
Figure 2:
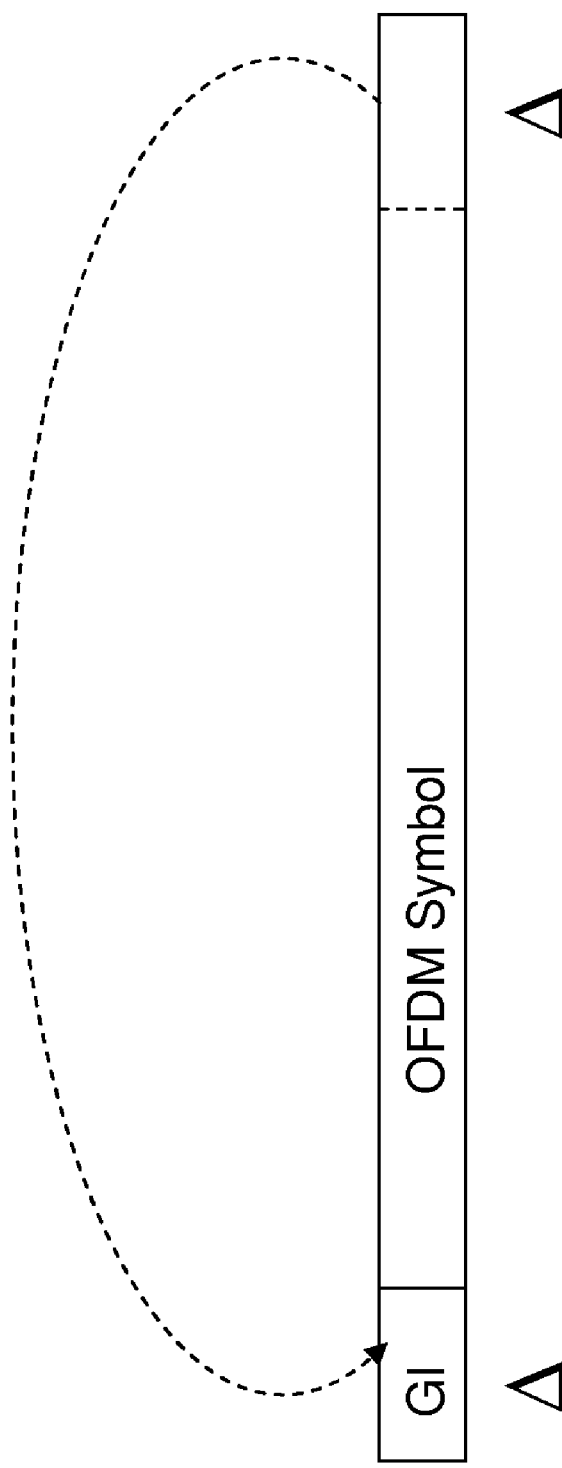
FIG. 2 illustrates an OFDM symbol with a guardband interval GI.

Referring initially to FIG. 2, a simple diagram of an OFDM symbol with a guard interval ("GI") is illustrated. As is known to those skilled in the art, the use of the guard interval involves copying the end of the symbol period for a duration $\Delta$ to the beginning of the symbol. The nature of the OFDM transmission is such that if the duration $\Delta$ of the GI is sufficiently long, certain inter-symbol interference ("ISI") due to multipath problems (where the receiver receives multiple copies of the transmitted OFDM symbol, due to reflections off buildings, and other paths to the antenna at the receiver from the transmitter) may easily be removed at the receiver.

The currently proposed DVB-T2 standard proposes that a two part preamble of parts P1 and P2 be used. DVB-T2 is a time division multiple access system: the preambles are used for synchronization and then signal recovery of received symbols in the receiver.

The preambles are OFDM signals. P2, the second part of the preamble, will contain several full-size OFDM symbols with level 1 ("L1") and level 2 ("L2") signaling. To receive P2, the receiver uses information contained in P1. A problem with receiving the preamble P1 is that prior to the reception of P1, the receiver does not have all of the information about the symbol transmissions needed to successfully tune the receiver and receive the DVB signals. Put another way, P1 is received from an uncharacterized transmission channel. The receiver therefore must detect the preamble P1, and compensate for any errors between the transmitter and receiver, without using information transmitted from the transmitter. After the preamble P1 is received correctly, additional correction can be made based on transmission parameters contained within the data transported by the preamble P1.

The first part of the two part DVB-T2 preamble, P1, is a single fixed-FFT OFDM symbol. P1 is structured so that it can be used to detect the presence of a DVB-T2 signal. (In some exemplary embodiments, if no T2 signal is located, the DVB-T2 receiver may still correctly receive DVB-T signals: this is not a required feature although it may be commercially desirable in order to maintain backwards compatibility with older transmitters in the environment.)

The preamble P1 also contains information to be used to decode the P2 symbols in the second part of the preamble, and the data symbols that follow. The preamble P1 symbol contains a 1024 ("1k") OFDM labeled part A, and divided into parts A1 and A2, which is differential binary phase shift keying ("DBPSK") modulated in the frequency direction by a pseudo-random binary sequence ("PRBS"). The PRBS is called the modulation signaling sequence ("MSS"). The MSS consists of two parts, S1 and S2. These two sequences carry signaling information, e.g. the FFT-size of the data symbols, the type of the T2 frame, etc.

Figure 3:
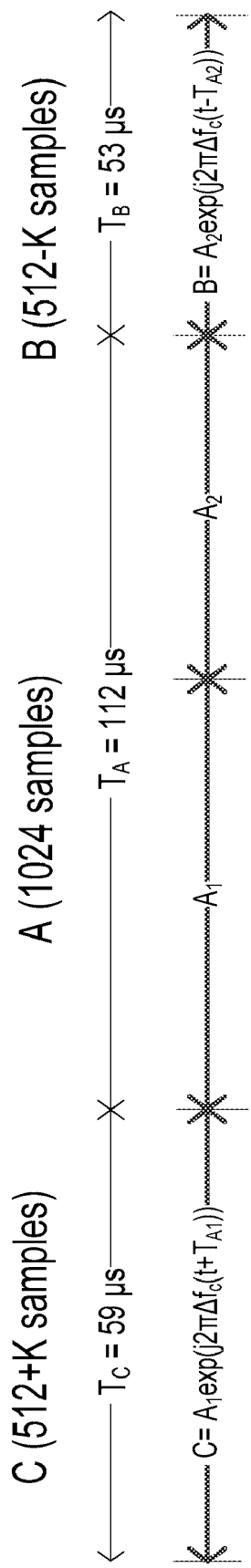
FIG. 3 illustrates a structure of an OFDM preamble signal parts C, A and B.

FIG. 3 illustrates the structure of the DVB-T2 preamble, P1. The preamble is 1k sample OFDM signal "A," divided into two parts A1 and A2. The preamble has two cyclic extensions "C," and "B." C and B may have different lengths. Each cyclic extension is part of symbol "A" with an offset K. The leading symbol "C" is comprised of 512+K samples. The trailing symbol "B" is comprised of 512−K samples. Thus the total number of samples from the sequence CAB is 2048 samples. Importantly, part C is a frequency shifted version of A1, and part B is a frequency shifted version of A2. Thus, it can be seen that C and B taken together contain the same information as part A. The frequency shift is currently proposed as one subcarrier for both C and B, in the upwards direction.

The MSS bits are pseudo-randomly distributed across the 384 carriers out of the 853 available carriers at the 1k mode. The used carriers in this example are thus boosted by the square root of (853/384). The allocation of the used carriers is determined by the carrier distribution sequence ("CDS"). The DVB-T2 signal can be shifted by the frequencies +/−1/6, +/−2/6, +/−3/6 MHz, compared to the nominal center frequency. The locations of the used carriers selected indicate the integer frequency shift.

The first part of the preamble, P1, is used in the DVB-T2 receiver's initial scan to determine and detect the presence of a T2 signal, to estimate the frequency offset from the CDS, and finally to detect the signaling from the MSS.

After the initial scan and T2 detection, the preamble P1 need not be used during normal data reception, however, it may be used to detect the frame start, or to improve synchronization between the transmitter and the receiver, and/or to improve channel estimation.

Figure 4:
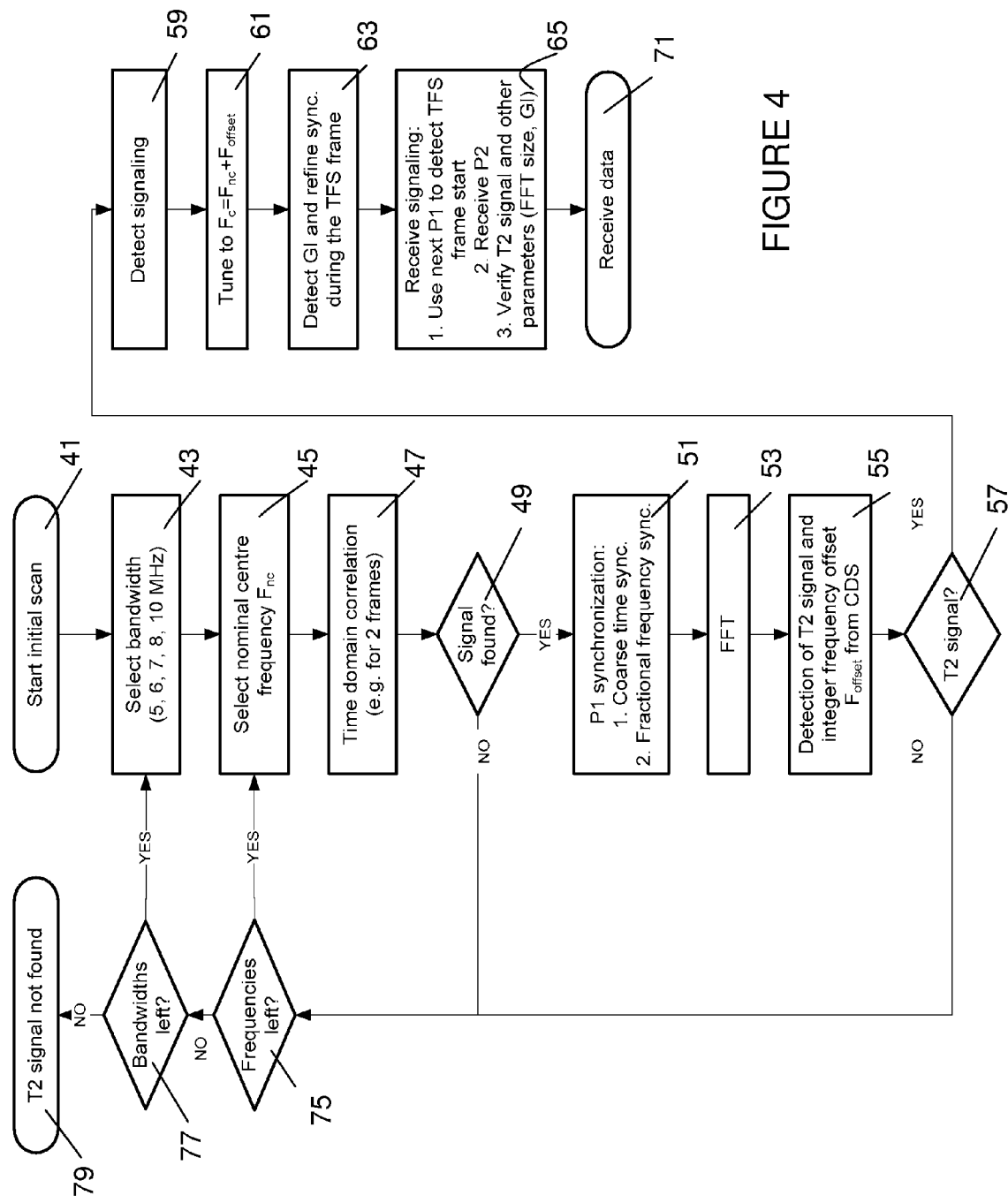
FIG. 4 illustrates a state diagram for an exemplary receiver initial scan to detect a preamble P1.

FIG. 4 depicts, in a state transition diagram, the sequence of steps an exemplary embodiment DVB-T2 receiver may perform in the initial scan to detect the presence of a T2 signal, and to receive the signaling information from the first part of the preamble, P1. In beginning the initial scan, it is assumed that the receiver has the following parameters already available to it: nominal center frequencies for different bandwidths; the structure of the preamble P1 pilot symbol (CAB, the FFT size, and the CDS); and possible signaling sequences (8×S1 and 16×S2.) The receiver must determine additional parameters from the first part of the preamble P1: the location of P1 (symbol timing), fractional frequency error, the integer frequency offset, the FFT-size for preamble P2 and data symbols, and other P1 signaling parameters. In addition to these parameters that the receiver will determine from the P1 preamble, there are additional parameters to be found by trial and error: the correct nominal center frequency, the bandwidth, and the guard interval ("GI") must be determined.

Once the receiver has determined this information, the receiver can receive L1 pre-signaling, and after that the receiver can receive any additional information needed for L2 signaling.

The initial scan to detect the presence of a DVB-T2 signal is performed by the DVB-T2 receiver by scanning the possible channels and the possible bandwidths. The receiver is tuned to the nominal center frequency of the selected channel, for each bandwidth, and the receiver then looks for a P1 symbol; if no P1 symbol is detected this sequence is repeated for each center frequency, and then for each bandwidth. However, note that it is not necessary for the receiver to check each frequency offset, because the presence of the P1 symbol can be detected at the nominal center frequency regardless of the frequency offset used.

In FIG. 4, the receiver starts in state 41. The initial scan begins by transitioning to state 43, where one of the possible bandwidths is selected. The receiver then transitions to state 45, where a nominal center frequency is selected ("$F_{nc}$" in the diagram). The receiver then transitions to state 47. In state 47, the time domain correlation state is used to find a P1 symbol. The P1 symbol can be found using the guard intervals ("GI") to perform correlation. This type of correlation is immune to any frequency offset, and because of the spectral characteristics of P1, the receiver need not scan each possible frequency offset. This type of correlation relates to T2 signal detection since the lack of a P1 symbol implies that the channel is a non-T2 channel. The guard interval correlation is intended where the delay spread of the channel stays within the guard interval period ($\Delta$ in FIG. 3). In a case where the P1 symbol is used in large scale single frequency networks ("SFNs"), the delays longer than the GI time interval introduce ISI. This is, however, not a problem because P1 is designed to be robust enough to tolerate such interference. P1 symbol detection in SFN channels is based on finding one of the multiple copies of P1. More accurate synchronization is to be obtained from the data symbols.

If no T2 signal is found in state 49, the receiver transitions back to state 75, where the receiver changes frequencies and selects the next nominal center frequency. (If no P1 symbols are found, once the frequencies for a given bandwidth are scanned, the receiver will change bandwidths, and this can be seen in state 77. If no symbol is found, then the state transitions to state 79, "T2 signal not found.")

If a P1 signal is located, the exemplary embodiment receiver state machine transitions to state 51. In state 51 the P1 synchronization is performed. In this state coarse estimates for time and frequency synchronization are used from the time domain correlation state, and these estimates are then further refined from the following symbols.

The preferred embodiment receiver then transitions to state 53 and performs the FFT transformation indicated by the information obtained in the synchronization and time domain correlation states. The receiver then transitions to state 55 and detects the T2 signal.

In a practical receiver for DVB-T2 systems, it is important to quickly identify channels that do not contain a T2 a signal. The preamble structure of P1 supports an iterative approach to scanning for T2 signals that quickly allows the receiver to determine channels that do not have T2 signals. A first elimination of non-T2 channels can be done during the time domain correlation state 47. The P1 signal is repeated every frame. The frame interval is around 200 milliseconds, and the P1 signal is robust in terms of signal to noise ratio ("SNR") requirements, testing two consecutive P1 positions may be a reliable method to detect the presence of a T2 signal. It is estimated this step would take about 500 milliseconds per RF channel. If this scanning is done over the 39 UHF channels, and even using 3 channel bandwidths, the total time used for this scan is only 58 seconds.

Once a potential P1 symbol is found, the receiver then transitions from state 49 to state 51 and performs the coarse time synchronization and the fractional frequency synchronization. The receiver then transitions to state 53 where the fast Fourier transform ("FFT") is performed.

In state 55, the receiver can detect the presence of the T2 signal and determine the integer frequency offset. The integer frequency offset can be determined using the power at the presumed pilot carriers to determine the correct integer offset. As an alternate exemplary embodiment, the PRBSs could be used to determine the integer frequency offset.

If the signal is a T2 signal, the receiver transitions from the decision state 57 to the "detect signaling" state 59. In state 59, the receiver continues to prepare to receive the second part of the preamble by continuing to gain information. In state 61, the receiver is tuned to the proper frequency using the nominal center frequency and the frequency offset to receive data symbols. The receiver also has to determine the guard interval for the P2 symbol. This is done during the following data frame. The symbol P2 may not be detected immediately after the first symbol P1 detected, but there is sufficient time to detect the GI in state 63 before the next frame, as the whole 200 milliseconds frame duration can be used. This step adds another 200 milliseconds to the signal acquisition time but, but this added time only occurs for the channels with detected T2 signals and not for every channel. As the maximum number of parallel multiplexes typically is on the order of 7 to 8, corresponding to the T2 signals that are on different RF channels, and the receiver needs to wait for the next P2 for each RF channel, the total time added to the initial scan sequence is less than 2 seconds; here the example frame length is assumed to be 200 milliseconds.

State 65 depicts the final steps in gathering the information the receiver needs to receive data. In state 65 the receiver uses the next symbol P1 to detect the frame start, the second preamble part P2 is received and the signal parameters required to receive data.

In state 71, the preferred embodiment receiver has gathered the needed parameters to receive data and data reception begins. The final step of the T2 signal detection is to confirm the detected parameters from the level 1 signaling in the received P2 symbols.

Figure 5:
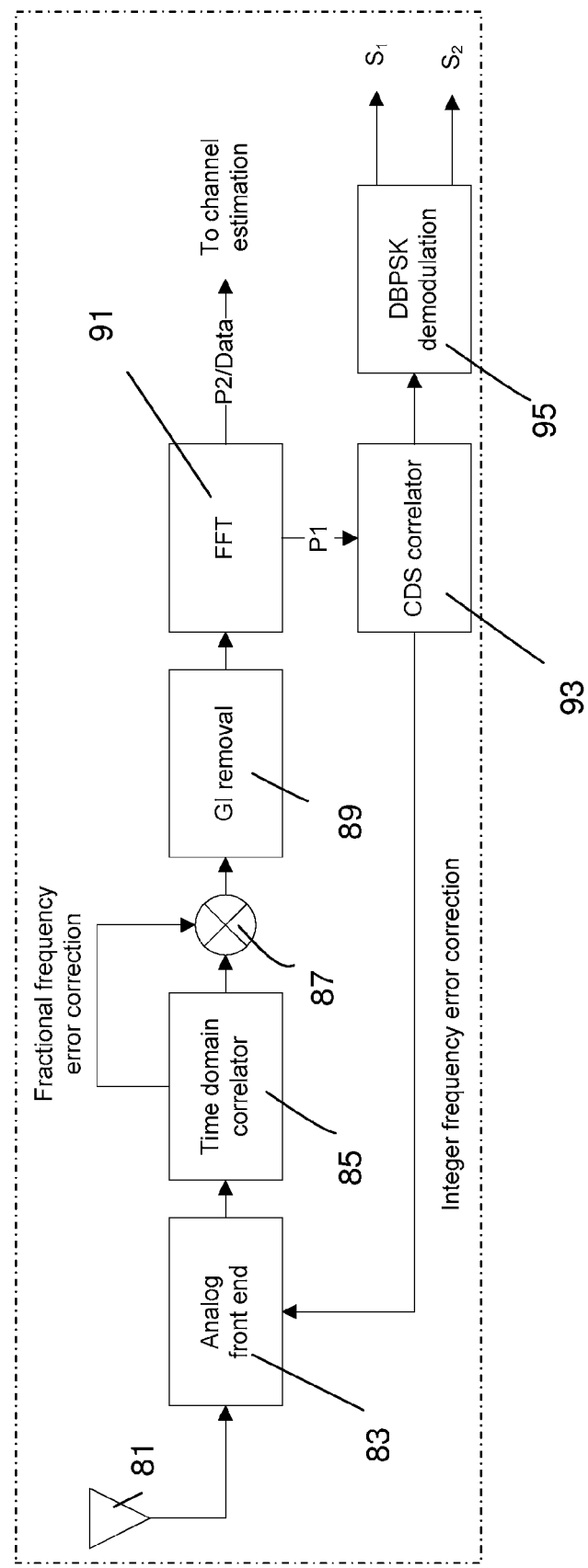
FIG. 5 illustrates a block diagram of an exemplary receiver implementation.

FIG. 5 depicts, in simplified block diagram form, a preferred embodiment receiver implementation for receiving the DVB-T2 signals including the preambles P1 and P2. In FIG. 5, antenna 81 receives the analog RF signals including the DVB-T2 signals, if present. The analog front end 83 then converts the signals to digital format using analog-to-digital conversion, and demodulates the signals. In block 85, the time domain correlator uses the structure of the preamble signal P1 to detect two correlations. First, the correlation between parts C and A1 in the preamble P1 is determined, and second, the correlation between parts B and A2 is determined. The frequency shifts are naturally part of this calculation. The symbol timing is determined by the absolute value of the correlator output, and the fractional frequency offset can be recovered from the corresponding angle.

Block 87 then makes the fractional frequency error correction. Block 89 removes the guard interval. Block 91 performs the FFT.

For detecting the P1 preamble, the CDS correlator, block 93, is important. The purpose of the CDS correlator is to determine the integer frequency offset, which might be up to 0.5 MHz. This is done in a first preferred embodiment by observing the power received at the presumed pilot subcarriers. The frequency offset may then be found by a sliding correlation over the frequency shift range, such as:

$$\Delta f_{int} = \max_k \left[ \sum_{p \in P} y_{p+k} y^*_{p+k} \right] \quad (1)$$

where P is the set of P1 pilot subcarriers without frequency offset and $y_x$ is the received symbol at carrier x.

After the CDS correlation, the preamble symbol P1 is then demodulated in block 95, the DBPSK demodulator, and MSS signals S1 and S2 are output. These signals contain transmission parameters needed by the receiver to receive the second preamble signal P2, and subsequent data signals.

In a one exemplary method, the preamble structure of P1 is advantageously used to determine a phase rotation caused by the integer frequency offset, and it is then corrected. Because of the particular structure of the preamble P1, as shown above in FIG. 3, the phase rotation that results from carrier frequency offset, depends on the integer frequency offset and the value of the P1 parameter K.

Carrier frequency offset causes a phase rotation, which is OFDM symbol dependent but independent of subcarrier index. A basic OFDM symbol consists of the data part and the guard interval. The guard interval is a cyclic copy from the end of the data part, as shown in FIG. 2 above.

In this case, the phase rotation between two consecutive OFDM symbols can be calculated from:

$$\Delta \phi = 2\pi \varepsilon \left(1 + \frac{N_g}{N}\right) \quad (2)$$

where N is the FFT-size, Ng is the number of guard interval samples, and $\epsilon$ is the normalized frequency offset, i.e., frequency offset divided by the subcarrier spacing.

Because any fractional frequency offset has already been corrected at this stage, $\epsilon$ is (at least approximately) an integer. Actually, the term $(1+N_g/N)$ can be interpreted as the "number of samples from the beginning of the previous OFDM symbol to the beginning of the current symbol normalized by the FFT-size N."

As shown in FIG. 3, the P1 symbol does not have this conventional structure, but it is possible to reformulate the equation. First of all, parts C and B can be concatenated (in the time domain) without problems since part A has the length of a full 1k symbol (1024), which means that the end of part C and the beginning of part B are in the same phase, regardless of the integer frequency offset. Thus, the phase difference between CB and A depends on the length of C. For the P1 symbol, equation (1) can be thus formulated as:

$$\Delta \phi = 2\pi \varepsilon \frac{N_C}{N} \quad (3)$$

where $N_C$ is the number of samples in part C.

First consider the case where K=0. When K=0, parts C and B have the same length 512, and the term $N_C/N$ equals ½ (512/1024), and equation (3) becomes:

$$\Delta \phi = \pi \varepsilon = \begin{cases} 2n\pi, & \text{even } \varepsilon \\ (2n+1)\pi, & \text{odd } \varepsilon \end{cases} \quad (4)$$

where n is an integer. This expression holds for the phase rotation between part C to part $A_1$ of preamble P1, and the rotation between parts B and $A_2$ of preamble P2 is opposite because it is the opposite order. It is important to note that $e^{jn\pi} = e^{jn(-\pi)}$, and therefore the correction is the same for both C and B. Thus, C and B can be first concatenated before the FFT, and the phase correction can be applied after FFT. That is the phase correction is performed in the frequency domain (post-FFT).

It can be seen from Equation (4) that the phase rotation can be corrected by multiplying the concatenation CB by 1 for even $\epsilon$ and −1 for odd $\epsilon$.

Now consider the case where the offset K is not equal to zero. In the current DVB-T2 proposal, when K is non-zero, the parts C and B of preamble P1 have a different length, which has some implications to the algorithm. However, C and B can still be simply concatenated in the time domain (before the FFT operation) and the effects of K can then be handled in frequency domain (after the FFT transformation). This is because the distance from the end of part C to the beginning of part B is still 1024 samples, which means that there is always a full number of cycles, regardless of the integer frequency offset.

For the case K>0, the phase rotation due to the frequency offset is no longer either 0 or π because the length of part C is not exactly 512 anymore. This causes a phase rotation term to occur, which depends on integer frequency offset and the value of K. This phase term can be calculated from (3) and it is:

$$\Delta \varphi = 2\pi \varepsilon \frac{512+K}{1024}. \quad (5)$$

This phase term can be easily compensated for in the receiver by a complex multiplication.

Figure 6:
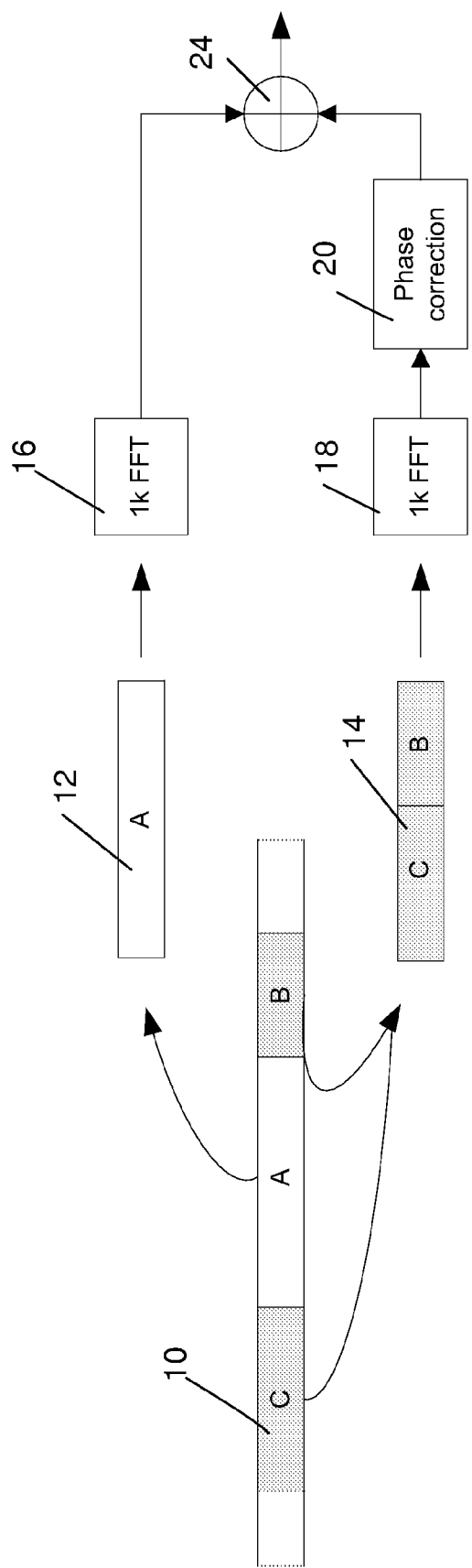
FIG. 6 illustrates an implementation of an exemplary receiver with phase correction for a frequency offset.

FIG. 6 depicts an example implementation of a receiver implementing the advantageous method described above for determining and compensating for the phase errors due to the integer frequency offset. Because the preamble P1, part A is a full 1k symbol, parts C and B can be simply concatenated in the time domain (before the FFT), since the 1k symbol has always a full number of cycles whatever the integer frequency offset. After the frequency transformation (post-FFT), the phase difference between A and C/B can be corrected and they can be coherently added. In FIG. 6, preamble P1 numbered element 10 is separated into parts A, numbered 12, and concatenated sequence CB, numbered 14. These parts are then transformed into sequences in the frequency domain by 1k FFT transforms at blocks 16, 18. The phase correction is applied to the CB sequence in the post-FFT domain at block 20. The adder 24 then simply coherently adds the two frequency domain sequences.

If K=0, combining C/B and A by using both estimation and correction can be described by the expression:

$$r_k^{CAB} = r_k^A + r_{k+\varepsilon}^{CB} \text{sgn}\left( \sum_{k \in CDS} r_k^A \text{conj}(r_{k+\varepsilon}^{CB}) \right) \quad (6)$$

where $\epsilon$ refers to the frequency shift between C/B and A in multiples of subcarrier spacing (e.g. $\epsilon=1$). The received frequency domain samples are marked by $r_k^A$, where k is the carrier index and the superscript 'A' indicates which parts have been used to calculate this sample. Notice that the sum in the expression (6) needs to be calculated only once, and after that it can be applied to all subcarriers (whatever k). If the correction is calculated based on the estimated integer frequency offset, the equation becomes:

$$r_k^{CAB} = r_k^A + r_{k+\epsilon}^{CB}(1 - 2 \cdot \mod(\Delta \hat{f}_{int}, 2)). \quad (7)$$

where $\Delta \hat{f}_{int}$ is the estimated integer frequency offset.

Another exemplary embodiment implementation of the method, when K=0, could take into account the reliability of the different parts using a weighted average function by calculating:

$$r_k^{CAB} = w r_k^A + (1-w) r_{k+\epsilon}^{CB} \text{sgn}\left(\sum_{k \in CDS} r_k^A \text{conj}(r_{k+\epsilon}^{CB})\right) \quad (8)$$

and $$r_k^{CAB} = w r_k^A + (1-w) r_{k+\epsilon}^{CB}(1 - 2 \cdot \mod(\Delta \hat{f}_{int}, 2)). \quad (9)$$

Such reliability information (the weighted average functions) could be found from SNR measurements and would be beneficial against, e.g. impulsive interference.

Compensating the phase term due to non-zero K (equation (5)) could be applied either to A or CB and it is just a complex rotation:

$$\tilde{r}_k^A = r_k^A \exp(-j\Delta\phi) \quad (10)$$

or $$\tilde{r}_k^{CB} = r_k^{CB} \exp(j\Delta\phi). \quad (11)$$

The combined output would in this case be the sum of phase corrected A and original CB, or, original A and phase corrected CB. Utilizing the reliability information by weighting can be applied similarly to the case K=0.

The example embodiment method for determining and compensating for the phase rotation in the frequency domain that is due to the integer frequency offset using C/B and A parts of the preamble P1 has the advantage over a more conventional approach that all of the signal energy of the preamble is used.

Another exemplary method is directed to a second problem in the receiver. Since the first part of the preamble P1 is the first symbol to be received, there is no prior knowledge within the receiver of the channel conditions, and thus the P1 symbol needs to include some means to overcome the channel distortions. This is the reason for using differential modulation between the subcarriers.

Figure 7:
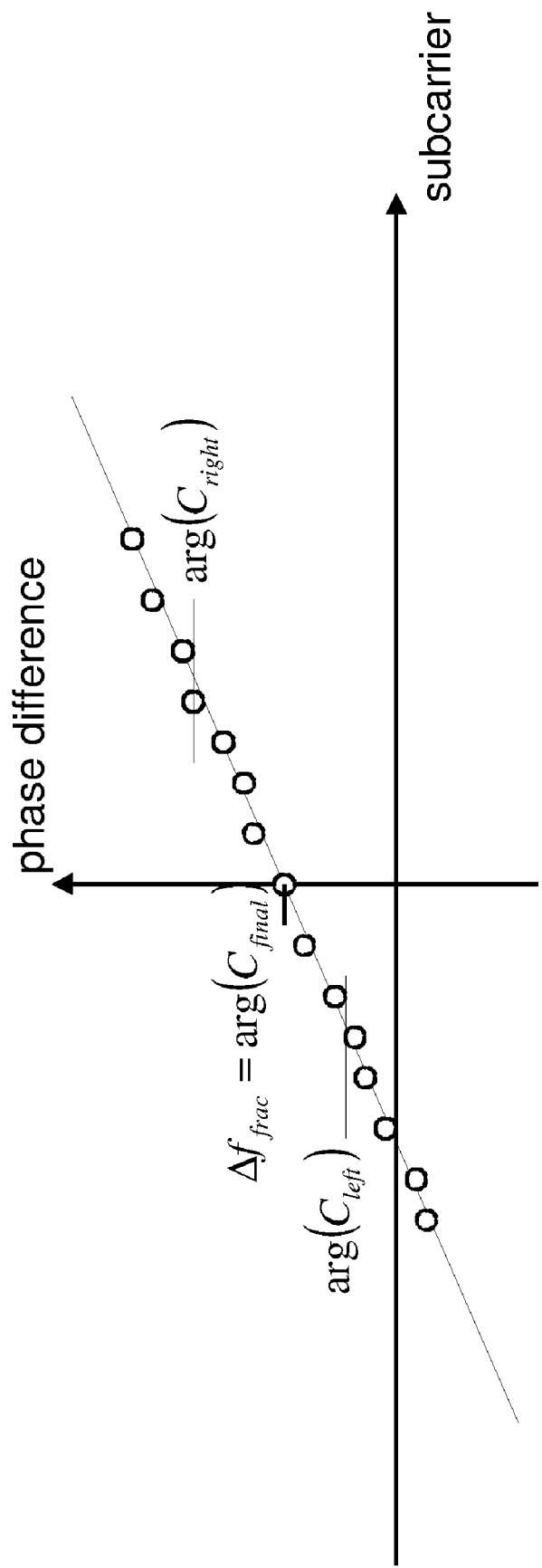
FIG. 7 illustrates the frequency dependent phase rotation due to a timing offset.

Differential modulation as used in the DVB-T2 transmitter and receiver is sensitive to timing offset (i.e. FFT-window misplacement), which causes a frequency dependent phase rotation. FIG. 7 illustrates the frequency dependent phase rotation. Thus, the adjacent subcarrier does not provide a good phase reference, since it is also disturbed by this phase rotation. When the timing offset (FFT window misplacement) increases, the phase rotation reaches a point where the DBPSK demodulation is no longer possible. This is problematic especially in receiving preamble symbol P1, because of the variable distance between the adjacent subcarriers (pseudo-random CDS). A paper entitled "An Integrated OFDM Receiver for High Speed Mobile Data Communication," H. Zou, B, McNair, B. Daneshrad, Proceedings of the IEEE Globecomm 2001, San Antonio, Tex., 2001, pp. 3090-3094, describes estimating the phase error due to the timing offset for adjacent symbols in the frequency domain.

An exemplary method for advantageously compensating for this timing offset has been determined. In this exemplary method, the approach is to estimate the phase rotation caused by the timing offset, and then correct for it.

First, the phase rotation is estimated. Since the fractional frequency offset can be estimated from the time domain correlation (modified guard interval correlation) and integer frequency offset can be corrected from the CDS correlation, it is assumed that at this point, there is now no phase difference between parts C, A, and B of the preamble P1 due to carrier frequency offset ("CFO"). The phase differences due to frequency offset may be corrected using the exemplary method described above. Alternative approaches may also be used to remove any phase error due to carrier frequency offset.

As described above, this error may be compensated for using the concatenation of CB in the time domain, and combining it with A after the transformation to the frequency domain (post FFT). Other approaches could also be used to eliminate phase error due to frequency offset between the transmitter and the receiver. In any event, since the phase error due to carrier frequency offset is now eliminated, the phase rotation from subcarrier k to subcarrier k+1, which depends on the timing offset, can be estimated. In one exemplary method this is done by calculating the average carrier-wise phase difference between the combination of C/B, and A. As described above, parts C and B together form a frequency shifted version of A, and they can be simply concatenated in the time domain, before the FFT is performed.

Once the phase rotation due to timing offset is estimated, it must be corrected. When the phase rotation between adjacent carriers has been estimated, it can be taken into account in DBPSK demodulation. The variable subcarrier spacing needs to be considered, but that is straightforward because the CDS is known to the receiver. If the frequency shift between parts C, A, and B is one subcarrier spacing, the phase rotation is estimated between neighboring subcarriers. Thus, in case the actual subcarrier spacing is higher, the algorithm can also correct phase rotations that exceed the phase ambiguity limit (i.e. $\pm\pi$).

Figure 8:
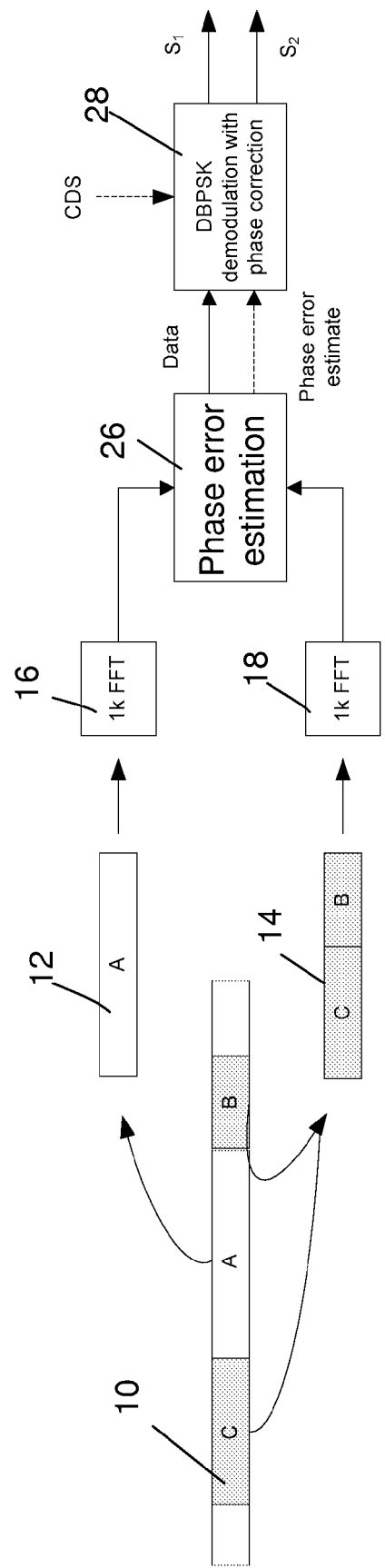
FIG. 8 illustrates an implementation of an exemplary receiver with phase correction for phase rotation caused by timing offset.

FIG. 8 illustrates, in a conceptual block diagram, an exemplary embodiment for implementing the receiver functions to perform the above described method for compensating for the phase rotation that occurs due to timing offsets. First, the preamble P1, element 10, is separated into parts A (element 12) and parts C and B, parts C and B need to be combined as shown in element 14. Assuming that fractional frequency error has been corrected this can be done by simple concatenation in the time domain (before FFT transformation). Next, after the FFT transformations to the frequency domain in blocks 16, 18, the phase error is estimated in block 26, and the phase error estimate is used in DBPSK demodulation 28, taking into account also the carrier distribution sequence ("CDS").

Estimate of the phase error, $\hat{\phi}$, can be mathematically expressed by:

$$\hat{\phi} = \frac{1}{K} \sum_{k \in CDS} \arg(y_{CB,k+1} y_{A,k}^*) \quad (12)$$

where $y_{A,k}$ is the kth subcarrier of part A, and K is the total number of subcarriers in P1. If this phase rotation needs to be translated into time offset in samples, it can be done by:

$$n_{error} = \frac{\phi N}{2\pi \Delta k} \quad (13)$$

where N and Δk are the FFT-size and subcarrier distance (N=1024 and Δk=1 in this case but it could be also larger).

Actually, the equations for the phase rotation apply exactly only when the timing offset causes a cyclic shift to the OFDM symbol. This is not strictly true for the P1 symbol, because the guard intervals ("GI") are shifted in frequency, and thus some noise is added to the estimation.

After the estimate is performed, the phase correction can be implemented in the DBPSK demodulation. Normally, the DBPSK demodulator might translate the phase difference to soft bits (–1 . . . 1) by:

$$b_k = 2 \cdot \frac{abs(arg(y_{k+1} y_k^*))}{\pi} - 1. \quad (14)$$

The core of this equation is the term $arg(y_{k+1} y_k^*)$, which calculates the phase difference between the reference carrier $y_k$ and the next used carrier $y_{k+1}$ (there might be null carriers between these two). In presence of timing offset, one of these received samples ($y_{k+1}$ or $y_k$) needs to be compensated by the estimated phase error to have the same phase reference for both samples. This can be done, e.g., by multiplying the carrier $y_{k+1}$ with a conjugate phase shift term.

Applying this derotation the equation becomes:

$$b_k = 2 \cdot \frac{abs(arg(e^{-j\phi d_k} y_{k+1} y_k^*))}{\pi} - 1 \quad (15)$$

where $d_k$ is the distance between used subcarriers $CDS_k$ and $CDS_{k+1}$ as multiples of subcarrier spacing, and arg( ) is supposed to return the angle between –π and π.

Two exemplary methods for enhanced preamble reception in a DVB-T2 receiver are described above. In the first, phase correction for errors due to integer frequency offset is described. In the second exemplary method, phase error due to timing offsets is estimated and the estimate is used so that the resulting phase difference is compensated for during the DBPSK demodulation of the preamble in the frequency domain. FIGS. 6 and 8 illustrate exemplary receiver implementations in block diagram form for performing the exemplary phase corrections.

Figure 9:
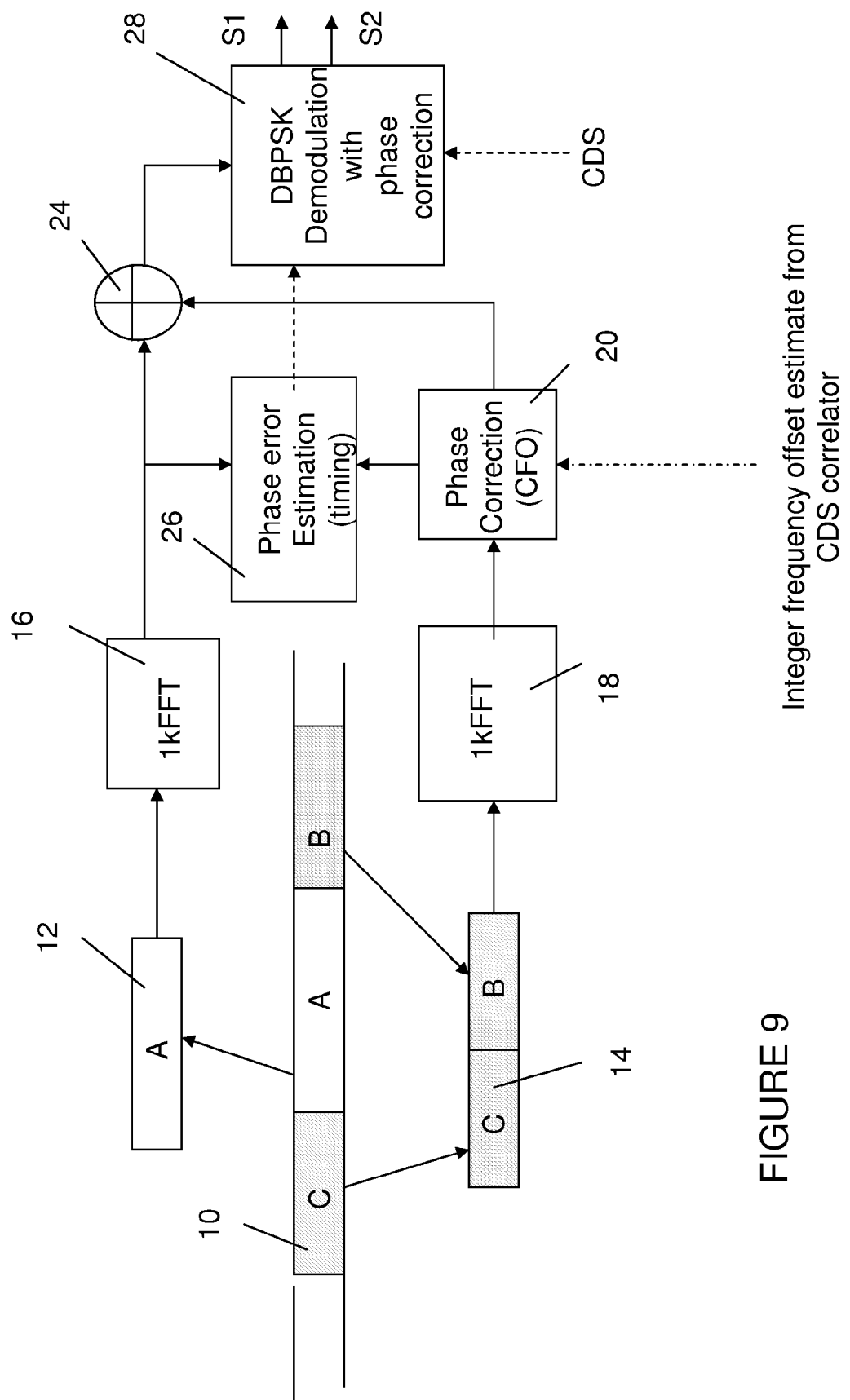
FIG. 9 illustrates an implementation of an exemplary receiver with phase correction for a frequency offset combined with phase correction for a timing offset.

In another exemplary method both phase error corrections are performed. That is, following the phase correction for the carrier frequency offsets, the phase error due to timing offsets is also compensated. FIG. 9 illustrates an exemplary receiver implementation for performing the combined methods. In FIG. 9, preamble P1 is received as element 10, and part A, numbered 12 and parts C and B, are determined. Simple concatenation of parts C and B forms CB, element 14, and this concatenation is performed in the time domain, that is prior to the FFT transformations.

Following the FFT transformations of part A in block 16 and the CB concatenation (recall this also contains part A with a frequency shift) in block 18, both being 1k FFT transformations for the 1k samples, the phase correction for the integer frequency offsets is performed in block 20, as described above. The output of this correction now has no phase rotation due to CFO, and so any remaining phase rotation is due to timing offsets. This output is then input to block 26, where the phase error due to timing offsets is estimated as described with respect to FIG. 8. The output of the estimation is used in the demodulation block 28 with DBPSK, compensating by correcting the phase difference. Adder 24 performs the coherent addition of the A and CB transformed signals, here CB has the phase correction applied prior to the summing operation of adder 24 as described above, see FIG. 6.

In another exemplary method, additional improvements in the operation of a DVB-T2 receiver in receiving the preamble can be obtained. It has been advantageously discovered that a correction can be made to find the correct sampling position from a corrupted correlation pulse. For example, in the case of an SFN channel, the correlation pulse may be badly corrupted.

Figures 10A, 10B, 10C:
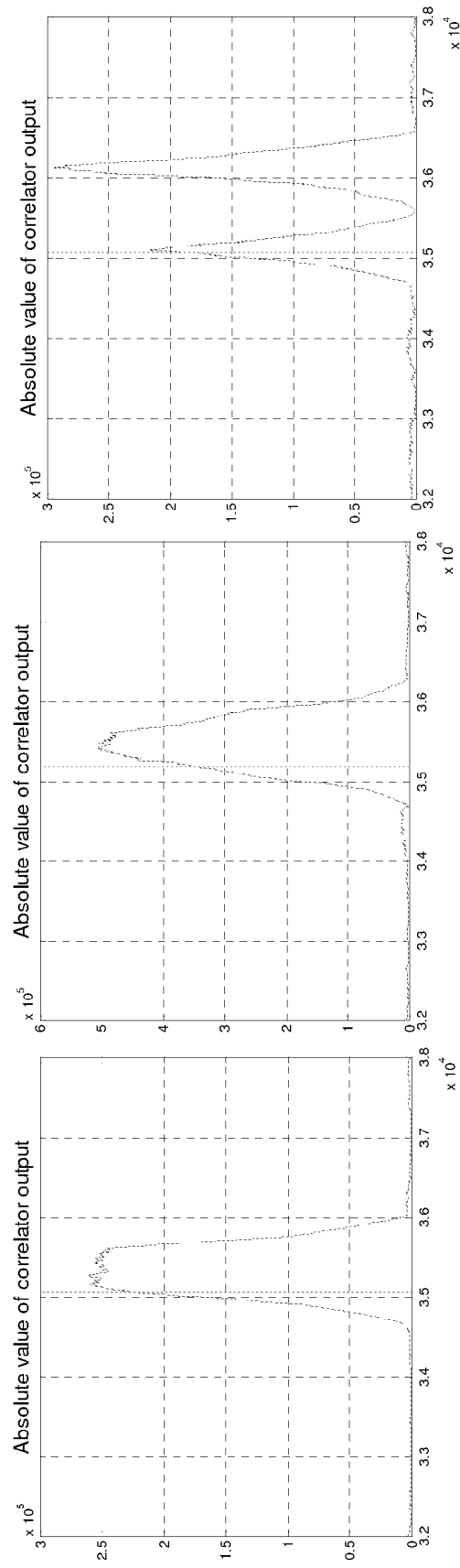
FIGS. 10(*a*), 10(*b*) and 10(*c*) illustrate correlator outputs for an ideal case, and two corrupted correlator outputs.

FIG. 10(a) illustrates an ideal case correlator output at 0 dB echo, FIG. 10(b) illustrates a correlator output for a channel with 0 dB echo of delay 250, and FIG. 10(c) illustrates a correlator output for 0 dB echo with delay 512.

In the exemplary compensation approach, decision logic is provided that detects the first rising edge in the correlator output and then takes into account the corrupted pulse shape in the case of SFN channels. An algorithm is provided where the first step is to calculate a derivative of a measure that observes the change in the correlator output between samples, where the samples are separated by a distance D:

$$s_n = abs(c_{n+D}) - abs(c_n) \quad (16)$$

where $c_n$ is the correlator output.

Next, the receiver finds the first sample that exceeds a threshold that is a certain percentage p of the maximum value of $s_n$. Finally, the resulting sampling position is corrected by D and a constant K:

$$\hat{n} = \min_n (s_n \geq p\max(s_n)) + D + K. \quad (17)$$

The exemplary DVB-T2 receiver implementations described above and particularly the receiver implementations illustrated in FIGS. 6, 8 and 9 may be provided using one or more integrated circuits. The integrated circuits may be programmable devices such as digital signal processors, microprocessors, advanced RISC machines and the like. ASIC integrated circuit technology may be used to provide a dedicated circuit to implement some, or all, of the functions of the receiver. Alternatively, one or more off-the-shelf existing integrated circuits may be used in combination with an ASIC, or in combination with programmable devices, to implement a receiver operable to perform one or more of the exemplary methods. Software may be used with existing receiver implementations or with new programmable devices in order to provide the operations needed to implement the exemplary receiver methods described above.

Embodiments of the present invention provide solutions to a DVB-T2 preamble receiver function. Timing offsets and frequency offsets in received OFDM preamble signal are estimated and compensated for, using the parts A, C and B of the preamble P1. A receiver uses the parameters in the preamble P1 symbol to receive signals including parameters in the preamble P2 symbol and then using these parameters, receives data on a DVB-T2 channel. The exemplary embodiments of the present invention as presented herein address how to provide the receiver including a DVB-T2 functionality at a minimum cost and with little wasted system resources.

The exemplary embodiments and methods described for comprehension of the features and advantages of the invention presented herein are not limiting. One skilled in the art will recognize that various known substitutions can be made while still performing the exemplary methods. Such substitutions and obvious modifications are contemplated as additional embodiments of the invention and are within the scope of the appended claims.

What is claimed is:

1. A method, comprising:
   receiving an orthogonal frequency division multiplexed preamble comprising symbol A of length N samples, a prefix C comprising a frequency shifted cyclic extension of a first portion of symbol A of length N/2 samples plus an offset K samples, and a suffix B comprising a frequency shifted cyclic extension of a remaining portion of symbol A of length N/2 samples minus offset K samples;
   concatenating prefix C and suffix B in the time domain to form a concatenated symbol CB that is a frequency shifted version of symbol A having length N; and
   utilizing the concatenated symbol CB to estimate at least one of a phase rotation and a phase error.

2. The method of claim 1, wherein utilizing the concatenated symbol CB to estimate at least one of a phase rotation and a phase error further comprises:
   transforming symbol A into the frequency domain by performing a fast Fourier transform of length N; and
   transforming the concatenated symbol CB into the frequency domain by performing a fast Fourier transform of length N.

3. The method of claim 2, wherein utilizing the concatenated symbol CB to estimate at least one of a phase rotation and or a phase error further comprises:
   estimating a phase rotation; and
   correcting the phase rotation in the frequency domain.

4. The method of claim 3, wherein estimating the phase rotation comprises estimating the phase error due to an integer frequency offset.

5. The method of claim 4, wherein estimating the phase rotation due to an integer frequency offset comprises performing the calculation:

$$\Delta\phi = 2\pi\varepsilon \frac{N_C}{N}$$

where $N_C$ is the number of samples in prefix C, and $\varepsilon$ is the normalized frequency offset.

6. The method of claim 3, wherein correcting the phase rotation comprises:
   performing a complex multiplication on the concatenated symbol CB to form a corrected symbol CB; and
   coherently adding the symbol A transformed into the frequency domain and the corrected symbol CB.

7. The method of claim 2, wherein utilizing the concatenated symbol CB to estimate at least one of a phase rotation and a phase error further comprises:
   estimating a phase error due to a timing offset; and
   correcting the phase error due to the timing offset during a demodulation in the frequency domain.

8. The method of claim 7, wherein estimating the phase error due to the timing offset comprises performing the calculation:

$$\hat{\phi} = \frac{1}{K} \sum_{k \in CDS} \arg(y_{CB,k+1} y_{A,k}^*)$$

on the frequency domain symbol A and the concatenated symbol CB, where $y_{A,k}$ is the kth subcarrier of part A, and K is the total number of subcarriers in the orthogonal frequency division multiplexed preamble.

9. The method of claim 7, wherein correcting the phase error due to the timing offset during a demodulation further comprises:
   performing differential binary phase shift keying demodulation comprising correcting for the phase error using the estimated phase error.

10. The method of claim 1, wherein N=1024.

11. The method of claim 1, wherein K=0.

12. The method of claim 1, wherein K is an integer greater than 0.

13. The method of claim 1, wherein receiving the orthogonal frequency division multiplexed preamble symbol further comprises receiving over-the-air spread spectrum modulated radio frequency signals.

14. The method of claim 1, wherein receiving the orthogonal frequency division multiplexed preamble symbol further comprises receiving digital video broadcast signals.

15. The method of claim 13, wherein receiving over-the-air spread spectrum modulated radio frequency signals further comprises receiving radio frequency signals at an antenna.

16. The method of claim 2, and further comprising:
   performing differential binary phase shift keying demodulation on the transformed symbols A and CB in the frequency domain and extracting parameters to be utilized in receiving subsequent orthogonal frequency division multiplexed symbols.

17. The method of claim 16, wherein extracting the parameters comprises extracting one or more modulated signal sequences.

18. An apparatus, comprising:
   receiver circuitry configured to receive an orthogonal frequency division multiplexed preamble comprising symbol A of length N samples, a prefix C comprising a frequency shifted cyclic extension of a first portion of symbol A of length N/2 samples plus an offset K samples, a suffix B comprising a frequency shifted cyclic extension of a remaining portion of symbol A of length N/2 samples minus offset K samples;
   concatenation circuitry configured to concatenate prefix C and suffix B to form a concatenated symbol CB of symbol A of length N samples; and
   phase estimation circuitry configured to utilize the concatenated symbol CB to calculate at least one of a phase rotation estimate and a phase error.

19. The apparatus of claim 18, and further comprising:
   fast Fourier transform circuitry configured to perform a fast Fourier transform of length N on symbol A and a fast Fourier transform of length N on the concatenated symbol CB.

20. The apparatus of claim 19, wherein the phase estimation circuitry configured to utilize the concatenated symbol CB to calculate at least one of a phase rotation estimate and a phase error further comprises:
   phase rotation estimate circuitry configured to estimate a phase rotation due to an integer frequency offset; and
   correction circuitry configured to perform a phase rotation correction using the phase rotation estimate.

21. The apparatus of claim 20, wherein the phase rotation estimate circuitry further comprises circuitry configured to perform the calculation:

$$\Delta\phi = 2\pi\varepsilon \frac{N_C}{N}$$

where $N_C$ is the number of samples in prefix C, and $\varepsilon$ is the normalized frequency offset.

22. The apparatus of claim 21, wherein the correction circuitry configured to perform a phase rotation correction using the phase rotation estimate further comprises:
   multiplier circuitry configured to perform a complex multiplication on the concatenated symbol CB to form a corrected symbol CB; and
   adder circuitry configured to coherently add the symbol A transformed by the fast Fourier transform circuitry and the corrected symbol CB.

23. The apparatus of claim 19, wherein the phase estimation circuitry configured to utilize the concatenated symbol CB, to calculate at least one of a phase rotation estimate and a phase error further comprises:
   circuitry configured to estimate a phase error due to a timing offset; and
   circuitry configured to correct the phase error in the frequency domain utilizing the phase error estimate due to the timing offset during a demodulation.

24. The apparatus of claim 23, wherein the circuitry configured to estimate a phase error due to a timing offset further comprises circuitry configured to perform the calculation:

$$\hat{\phi} = \frac{1}{K} \sum_{k \in CDS} \arg(y_{CB,k+1} y_{A,k}^*)$$

on the frequency domain symbol A and the concatenated symbol CB, where $y_{A,k}$ is the kth subcarrier of part A, and K is the total number of subcarriers in the orthogonal frequency division multiplexed preamble.

25. The apparatus of claim 23, wherein the circuitry configured to correct the phase error utilizing the phase error estimate due to the timing offset during a demodulation further comprises:
   demodulation circuitry configured to correct the phase error due to the timing offset by performing differential binary phase shift keying demodulation including correcting for the phase error using the phase error estimate.

26. The apparatus of claim 18, wherein the receiver circuitry further comprises:
   analog front end circuitry configured to receive spread spectrum modulated radio frequency signals and to perform baseband processing on the received radio frequency signals; and
   analog-to-digital circuitry configured to receive analog signals from the analog front end circuitry and to perform analog-to-digital conversion, outputting the orthogonal frequency division multiplexed preamble.

27. The apparatus of claim 18, and further comprising an antenna.

28. A non-transitory computer readable medium containing instructions that, when executed by a programmable receiver processor, cause an apparatus to:
   receive an orthogonal frequency division multiplexed preamble comprising symbol A of length N samples, a prefix C comprising a frequency shifted cyclic extension of a first portion of symbol A of length N/2 samples plus an offset K samples, a suffix B comprising a frequency shifted cyclic extension of a remaining portion of symbol A of length N/2 samples minus offset K samples;
   concatenate prefix C and suffix B in the time domain to form a concatenated symbol CB that is a frequency shifted version of symbol A having length N; and
   utilize the concatenated symbol CB to estimate at least one of a phase rotation and a phase error.

29. The non-transitory computer readable medium of claim 28, further comprising instructions that, when executed by a programmable receiver processor, cause the apparatus to:
   transform symbol A into the frequency domain by performing a fast Fourier transform of length N; and
   transform the concatenated symbol CB into the frequency domain by performing a fast Fourier transform of length N.

30. The non-transitory computer readable medium of claim 29, wherein the instructions, when executed by a programmable receiver processor, cause the apparatus to utilize the concatenated symbol CB to estimate at least one of a phase rotation and a phase error by calculating:

$$\Delta\phi = 2\pi\varepsilon \frac{N_C}{N}$$

where $N_C$ is the number of samples in C, and $\varepsilon$ is the normalized frequency offset.

31. The non-transitory computer readable medium of claim 29, wherein the instructions, when executed by a programmable receiver processor, cause the apparatus to:
   correct the phase rotation due to an integer frequency offset by performing a complex multiplication on the concatenated symbol CB to form a corrected symbol CB; and
   coherently add the symbol A transformed into the frequency domain and the corrected symbol CB.

32. The non-transitory computer readable medium of claim 29, wherein the instructions, when executed by a programmable receiver processor, cause the apparatus to:
   estimate phase error due to a timing offset; and
   correct the phase error due to the timing offset during a demodulation.

33. The non-transitory computer readable medium of claim 32, wherein the instructions, when executed by a programmable receiver processor, cause the apparatus to estimate the phase error by calculating:

$$\hat{\phi} = \frac{1}{K} \sum_{k \in CDS} \arg(y_{CB,k+1} y_{A,k}^*)$$

on the symbol A transformed into the frequency domain and the concatenated symbol CB, where $y_{A,k}$ is the kth subcarrier of part A, and K is the total number of subcarriers in the orthogonal frequency division multiplexed preamble.

34. The non-transitory computer readable medium of claim 33, wherein the instructions, when executed by a programmable receiver processor, cause the apparatus to correct the phase error with:
   differential binary phase shift keying demodulation including correcting for the phase error using the estimated phase error.

35. An apparatus, comprising:

an antenna for receiving over the air signals comprising orthogonal frequency division multiplexed symbols;

means for receiving an orthogonal frequency division multiplexed preamble comprising symbol A of length N samples from the antenna, a prefix C comprising a frequency shifted cyclic extension of a first portion of symbol A of length N/2 samples plus an offset K samples, and a suffix B comprising a frequency shifted cyclic extension of a remaining portion of symbol A of length N/2 samples minus offset K samples;

means for concatenating prefix C and suffix B in the time domain to form a concatenated symbol CB that is a frequency shifted version of symbol A having length N; and means for utilizing the concatenated symbol CB to estimate at least one of a phase rotation and a phase error.

* * * * *

UNITED STATES PATENT AND TRADEMARK OFFICE
CERTIFICATE OF CORRECTION

PATENT NO. : 8,208,522 B2  
APPLICATION NO. : 12/044026  
DATED : June 26, 2012  
INVENTOR(S) : Miika Sakari Tupala et al.

Page 1 of 1

It is certified that error appears in the above-identified patent and that said Letters Patent is hereby corrected as shown below:

In the Claims

Column 23, Claim 23, Line 23:
Please delete "CB, to" and replace with --CB to--

Signed and Sealed this
Sixth Day of August, 2013

Teresa Stanek Rea
*Acting Director of the United States Patent and Trademark Office*